US008140969B2

(12) United States Patent
Bauchot et al.

(10) Patent No.: US 8,140,969 B2
(45) Date of Patent: Mar. 20, 2012

(54) DISPLAYING SYNCHRONOUSLY DOCUMENTS TO A USER

(75) Inventors: Frederic Bauchot, Saint-Jeannet (FR); Gerard Marmiqere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 12/323,733

(22) Filed: Nov. 26, 2008

(65) Prior Publication Data

US 2009/0144620 A1 Jun. 4, 2009

(30) Foreign Application Priority Data

Dec. 3, 2007 (EP) .................................... 07301618

(51) Int. Cl.
*G06F 17/00* (2006.01)
(52) U.S. Cl. ........................................ 715/277; 715/272
(58) Field of Classification Search .................. 715/274, 715/277, 255, 256, 272, 241
See application file for complete search history.

(56) References Cited

U.S. PATENT DOCUMENTS

| 6,021,418 | A  | * | 2/2000  | Brandt et al. ................. 715/205 |
| 6,654,030 | B1 | * | 11/2003 | Hui ............................... 715/720 |
| 7,412,463 | B2 | * | 8/2008  | Mitchell et al. ..................... 1/1 |
| RE42,167  | E  | * | 2/2011  | Morgan, III .................. 707/758 |
| 7,921,360 | B1 | * | 4/2011  | Sundermeyer et al. ....... 715/255 |
| 2001/0006389 | A1 | * | 7/2001  | Nanba et al. .................. 345/418 |
| 2002/0188636 | A1 | * | 12/2002 | Peck et al. ..................... 707/530 |
| 2003/0035002 | A1 | * | 2/2003  | Moles ........................... 345/760 |
| 2004/0167784 | A1 | * | 8/2004  | Travieso et al. ........... 704/270.1 |
| 2004/0261016 | A1 | * | 12/2004 | Glass et al. ................... 715/512 |
| 2005/0257140 | A1 | * | 11/2005 | Marukawa .................... 715/513 |
| 2006/0206464 | A1 | * | 9/2006  | Marukawa ........................ 707/3 |
| 2006/0282765 | A1 | * | 12/2006 | Hintermeister et al. ...... 715/513 |
| 2007/0150721 | A1 | * | 6/2007  | Goldman et al. ............. 713/154 |
| 2008/0010588 | A1 | * | 1/2008  | Wake et al. ................... 715/234 |
| 2008/0141112 | A1 | * | 6/2008  | Aoki ............................. 715/234 |
| 2008/0148147 | A1 | * | 6/2008  | Poston et al. ................. 715/273 |

* cited by examiner

*Primary Examiner* — Laurie Ries
(74) *Attorney, Agent, or Firm* — Douglas A. Lashmit; Hoffman Warnick LLC

(57) ABSTRACT

A method and a data processing system for displaying a first document and a second document in a synchronized way are disclosed. The first document includes a first set of control tags. The second document includes a second set of control tags. A control tag of the first set of control tags is uniquely assigned to a control tag of the second set of control tags. A portion of the first document is displayed to a user, wherein a first control tag is identified in the first document, wherein the first control tag corresponds to the control tag of the first set of control tags which is situated in essence at the top of the displayed portion of the first document. Furthermore, a second control tag is determined in the second document, wherein the second control tag corresponds to the control tag of the second set of control tags to which the first control tag is uniquely assigned. A portion of the second document is then displayed simultaneously to the display of the portion of the first document to the user, wherein the second control tag is situated in essence at the top of the displayed portion of the second document.

18 Claims, 5 Drawing Sheets

DISPLAYING SYNCHRONOUSLY DOCUMENTS TO A USER

FIELD OF THE INVENTION

The invention relates to a method and data processing system for displaying synchronously two or more documents to a user.

BACKGROUND ART

Two documents can be interrelated with each other in the sense that the subject matter disclosed in one document is correlated with or associated with the subject matter disclosed in the other document. For example, a first document might be a patent application written in English and a second document might be the corresponding French translation. A person who wishes to compare the two documents with each other, for example in order to edit the French translation, might however encounter the inconvenience that the person must search for a section in the English original that corresponds to the section in the French translation which is currently edited by the person, when the person switches from the French translation to the English original. This inconvenience might cause a substantial prolongation in time required to complete and finish the French translation.

SUMMARY OF THE INVENTION

The present invention provides a method and data processing system for displaying synchronously a first document and at least a second document to a user.

In accordance with an embodiment of the invention, there is provided a method of displaying synchronously a first document and a second document to a user on a screen of a computer system. The first document comprises a first set of control tags and the second document comprises a second set of control tags. A control tag of the first set of control tags is uniquely assigned to a control tag of the second set of control tags. The method comprises displaying a portion of the first document on the screen to the user and identifying a first control tag in the first document. The first control tag corresponds to the control tag of the first set of control tags which is located in essence at the top of the displayed portion of the first document. Furthermore, the method comprises the step of determining a second control tag in the second document. The second control tag is the control tag of the second set of control tags to which the first control tag is uniquely assigned. The second document or at least a portion of the second document is then displayed to the user on the screen so that the second control tag is situated in essence at the top of the displayed portion of the second document.

The first document might relate to an English patent application and the second document might relate to the French translation according to the example given in the background section. The user might for example have scrolled in the first document so that a portion of the first document is displayed on the screen to the user. The first control tag in the first document precedes in essence the displayed portion of the first document, since it is located in essence at the top of the displayed portion of the first document. The first control tag corresponds in that sense to the uppermost control tag of the displayed portion of the first document.

The second control tag is linked with the first control tag in the sense that the first control tag is uniquely assigned to the second control tag. The assignment might for example be based on the fact that the portion of the first document that follows the first control tag corresponds to the portion of the second document that follows the second control tag. For example, a particular paragraph of the English patent application follows the first control tag whereas the corresponding French translation follows the second control tag. The method in accordance with the invention is therefore particularly advantageous as with regard to the example of the original English patent application and the corresponding French translation, a user who is trying to understand or to improve the French translation can display a portion of the English original document and then immediately identify the location of the corresponding French version as the French translation is displayed such that the displayed portion of this document relates to the displayed portion of the original English document.

In accordance with an embodiment of the invention, the method further comprises identifying a third control tag in the first document. The third control tag corresponds to the control tag of the first set of control tags which is situated in essence at the bottom of the displayed portion of the first document. Furthermore, a fourth control tag is determined in the second document. The fourth control tag corresponds to the control tag of the second set of control tags to which the third control tag is uniquely assigned. The portion of the second document is then displayed on the screen so that the fourth control tag is situated in essence at the bottom of the displayed portion of the second document. Thus the portion of the second document that is related to the displayed portion of the first document is visualized synchronously to the portion of the first document to the user. The user is therefore able to immediately compare the corresponding portions of the first and second documents with each other.

In accordance with an embodiment of the invention, the size of the displayed portion of the second document is adapted so that the lengths of the displayed portion of the second document matches the lengths of the displayed portion of the first document. Furthermore or alternatively, the size of the displayed portion of the second document is adapted so that the width of the displayed portion of the second document matches the width of the displayed portion of the first document. Correspondingly, for example based on a change of the size of the displayed portion of the second document due to a corresponding user action, the size of the displayed portion of the first document is adapted to match the size in length and/or in width of the second document.

In accordance with an embodiment of the invention, the portions of the first and second documents are displayed side by side to the user, for example in two windows on the screen of a computer. This provides the advantage that the comparison between the corresponding portions of the first and second documents is greatly facilitated as the user is able to see the displayed portions in parallel on the screen.

In accordance with an embodiment of the invention, the method further comprises defining the control tags of the first set of control tags in the first document, wherein with the exception of the control tag situated at the end of the first document, each control tag of the first set of control tags precedes a particular part of the first document, and wherein the particular part of the first document relates to a particular part of the second document. Furthermore, the control tags of the second set of control tags are defined such that a control tag of the second set of control tags to which a control tag of the first set of control tags is uniquely assigned precedes the part of the second document which is related to the part of the first document that is preceded by the control tag of the first set of control tags.

A fifth control tag of the first set of control tags might for example precede a particular part of the first document and a corresponding sixth control tag of the second set of control tags might precede the corresponding part in the second document, wherein the fifth control tag is uniquely assigned to the sixth control tag. If a user scrolls in the first document to the part that succeeds the fifth control tag so that the fifth control tag is located in essence at the top of the displayed portion, the second document is according to an embodiment of the method in accordance with the invention arranged so that the sixth control tag precedes the displayed portion of the second document. The sixth control tag will thus also be located in essence at the top of the displayed portion of the second document. The user is therefore immediately able to compare the corresponding parts in the first and second documents which might greatly facilitate edits in one of the document.

In accordance with an embodiment of the invention, the method comprises defining the control tags of the first set of control tags in the first document, wherein with the exception of the control tag situated at the end of the first document, each control tag of the first set of control tags precedes a particular part of the first document. The method in accordance with the invention furthermore comprises deriving the second document from the first document, wherein a control tag of the first set of control tags is uniquely assigned to a control tag of the second set of control tags, wherein a control tag of the second set of control tags precedes the part of the second document which is derived from the part of the first document that is preceded by the corresponding control tag of the first set of control tags.

The second document might, for example, be generated from the first document, wherein the relative positions of the control tags are preserved so that the assignments of the control tags of the first set of control tags to the control tags of the second set of control tags reflect the preservation of the relative positions of the control tags. The second document might for example correspond, also already mentioned above, to the French translation of an English patent application. Each paragraph in the English document might be preceded by a control tag. Thus due the preservation of the control tags in the French translation, each paragraph in the French translation is preceded by a control tag of the second set of control tags, wherein the assignments of the control tags of the first set of control tags to the control tags of the second set of control tags reflect the corresponding paragraphs.

In accordance with an embodiment of the invention, the part of the first document that is preceded by a control tag of the first set of control tags is displayed in parallel to the part of the second document that is preceded by the corresponding control tag of the second set of control tags to which the control tag of the first set of control tags is uniquely assigned. The user is therefore able to easily and unambiguously identify the corresponding or interrelated parts in the first and second document due to the assignments of the control tags of the first set of control tags to the control tags of the second set of control tags which allows to arrange the second document with respect to the first document so that the corresponding or interrelated parts in both documents are displayed in parallel to each other.

In accordance with an embodiment of the invention, the control tags of the first set of control tags and the control tags of the second set of control tags are invisible to the user. The control tags are therefore not displayed on the screen to the user. The control tags might for example be comprised in metadata of the corresponding first and second documents, wherein they are specified in the metadata so that they remain invisible.

In accordance with an embodiment of the invention, a control tag of the first set of control tags is defined for each control character in the first document, and a control tag of the second set of control tags is defined for each control character in the second document. A control character in a document can be regarded as a non-printing character which does by itself not represent a written symbol.

In accordance with an embodiment of the invention, a control tag of the first set of control tags is defined for each line feed command in the first document, and a control tag of the second set of control tags is defined for each line feed command in the second document. A line feed command relates to the command that indicates the end of a line of text in the document. The line feed command is also known as a new line, a line break or an end of line command or character. The line feed command can be regarded as a special kind of control character as software applications and operating systems usually represent a line feed command with one or two control characters.

In accordance with an embodiment of the invention, a control tag of the first set of control tags is defined for each delimiter in the first document, and a control tag of the second set of control tags is defined for each delimiter in the second document. A delimiter can be regarded as a special control character or a sequence of control characters used to specify the boundary between separate, independent regions in plain text or other data streams such as plain text and integrated figures. In particular, a control tag can be associated with delimiters that indicate the beginning and the end of a figure in plain text. This allows the correlation of a figure displayed for example in the second document with an explanation for the figure in the first document.

In accordance with an embodiment of the invention, a first control character in the first document relates to a second control character in the second document and the control tag of the first set of control tags which is defined for the first control character is uniquely assigned to the control tag of the second set of control tags which is defined for the second control character.

In accordance with an embodiment of the invention, the first and the second documents are electronic documents.

According to another aspect of the invention, there is provided a computer program product. The computer program product comprises computer executable instructions. The instructions are adapted, when executed on a computer, to cause the computer to perform steps of the method in accordance with the invention.

According to a further aspect of the invention, there is provided a data processing system for synchronously displaying a first document and a second document, wherein the data processing system is configured to carry out the method in accordance with the invention.

BRIEF DESCRIPTION OF THE DRAWINGS

In the following embodiments of the invention will be described in greater detail making reference to the drawings.

DETAILED DESCRIPTION OF THE INVENTION

Figure 1:
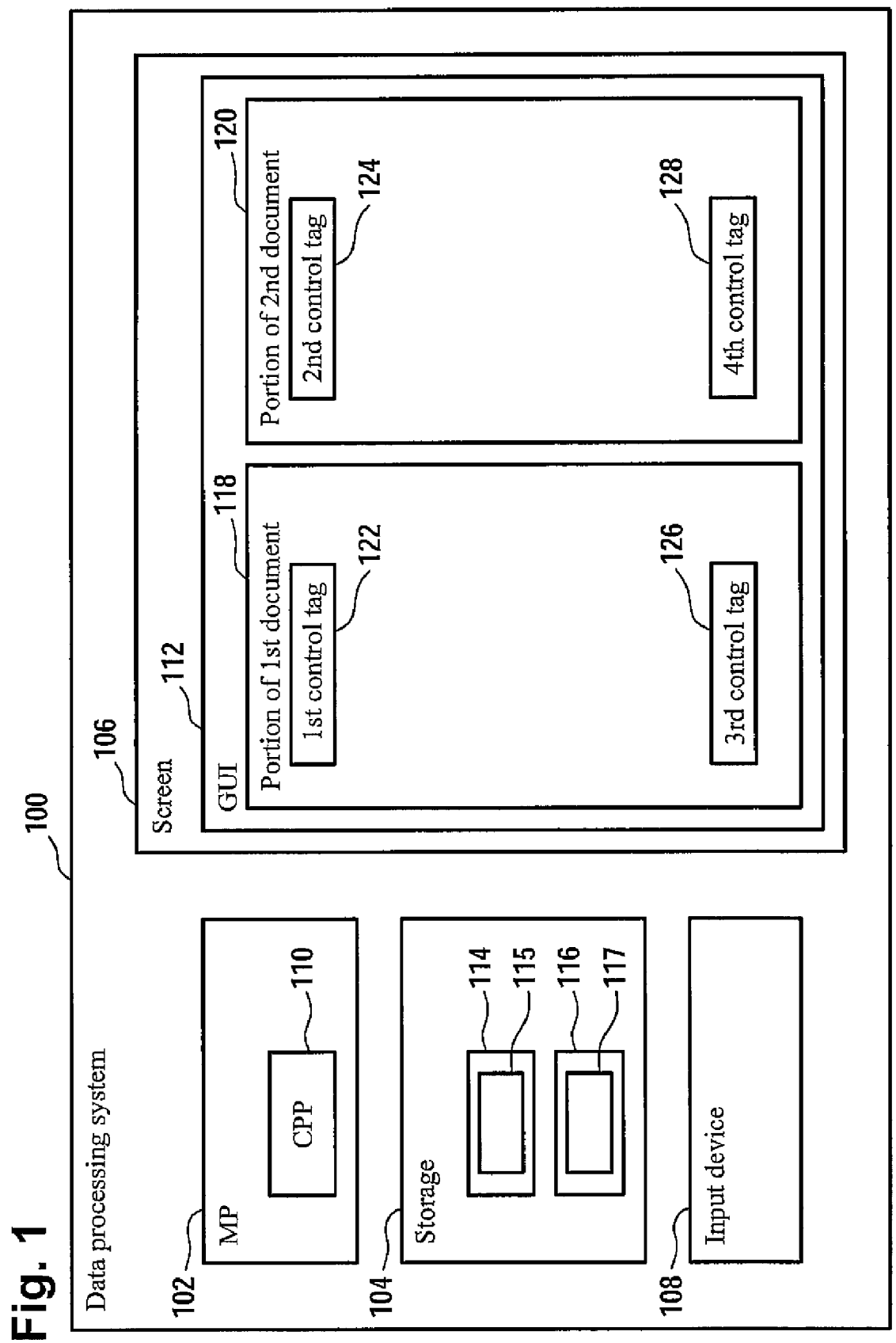
FIG. 1 shows a block diagram of a data processing system in accordance with the invention.

FIG. 1 shows a block diagram of a data processing system 100. The data processing system 100 comprises a microprocessor 102, storage 104, a screen 106, and an input device 108 which is for example a keyboard or a pointing device such as a mouse.

The microprocessor 102 executes a computer program product (CPP) 110 which is stored on the storage 104 and loaded for execution into the microprocessor 102. The computer program product 110 causes the microprocessor 102 to initiate the display of a graphical user interface (GUI) 112.

The graphical user interface 112 is used to synchronously display documents such as the documents 114 and 116 that are stored on the storage 104 to a user in front of the screen of the data processing system 100.

The first document 114 comprises a first set of control tags 115. The control tags of the first set of control tags 115 are integrated within the first document 114 so that each control tag of the first set of control tags relates to a particular position in the document when it is displayed in the graphical user interface 112. Similarly, the second document 116 comprises a second set of control tags 117. Each control tag of the second set of control tags 117 is arranged at a particular position within the second document 116 when it is displayed in the graphical user interface 112. A control tag of the first set of control tags 115 is furthermore uniquely assigned to a control tag of the second set of control tags 117.

A user might initiate the visualization of the first document 114 by inputting the corresponding command via the input device 118 into the data processing system 100 which causes the microprocessor 110 to load the first document and to output it on the graphical user interface 112.

According to the example illustrated in FIG. 1, only a portion 118 of the first document 114 is displayed. Furthermore, the user might initiate the display of the second document 116 by use of the input device 108. The input device 108 might for example be a mouse so that the user is able to point with the mouse pointer to an icon on the screen 106 corresponding to the second document 116. Via a double click on the icon, the microprocessor 102 is caused to load the second document 116 and to display a portion 120 of the second document 116 in the graphical user interface 112.

When a portion of the first document 118 is visualized within the graphical user interface 112, a first control tag 122 is identified within this portion. The first control tag 122 corresponds to the control tag of the first set of control tags 115 which is the uppermost control tag in the displayed portion 118 of the first document. Furthermore, a second control tag 124 is determined in the second document 116, wherein the second control tag 124 corresponds to the control tag of the second set of control tags 117 to which the first control tag is uniquely assigned. The portion 120 of the second document 116 is then displayed so that the second control tag is located in essence at the top of the displayed portion 120 of the second document.

The assignment of the first control tag 122 to the second control tag 124 can be such that the content that follows the first control tag in the first document 114 is correlated with or associated with or somehow linked with the content in the second document 116 that follows the second control tag 124. Thus the user in front of the screen 106 is immediately able to compare the content of the first document that follows the first control tag 122 with the somehow related content in the second document that follows the second control tag 124.

The portion 118 and the portion 120 of the first and second documents may be displayed in the graphical user interface 112 in parallel (side-by-side) in order to facilitate the synchronized visual access of the user to both documents.

According to an embodiment of the invention, a third control tag 126 is identified in the displayed portion 118 of the first document. The third control tag 126 corresponds to the control tag of the first set of control tags 115 which is situated in essence at the bottom of the displayed portion of the first document. Furthermore, a fourth control tag 128 that corresponds to the control tag of the second set of control tags 117 to which the third control tag 126 is uniquely assigned is identified within the second document 116. The portion 120 of the second document is displayed so that the fourth control tag 128 is located at the bottom of the portion 120. Thus the displayed portion 118 of the first document and the displayed portion 120 of the second document comprise contents that are somehow interrelated to each other.

For example, the first document 114 might be, as already mentioned before, an original English patent application and the second document 116 might be the translated French version of this patent application so that the content shown in the portion 120 corresponds to the French translation of the sections in the English original shown in portion 118 of the first document.

Furthermore, as illustrated schematically by FIG. 1, the displayed portion of the second document is according to a further embodiment of the invention adapted so that the length and the width of the window corresponding to the portion 120 of the second document in the graphical user interface 112 corresponds to the length and width of the window corresponding to the portion 118 of the first document in the graphical user interface 112.

It is needless to say that the control tags of the first and second set of control tags are used by the computer program product 110 in order to identify the corresponding parts in the first and second documents but that these control tags are not visualized to the user. They remain hidden from the user.

As mentioned before, the first document 114 might refer to an English patent application and thus might correspond in essence to a text document which comprises at the end of each line a line feed command. A control tag of the first set of control tags 115 might be assigned to each line feed command. Thus the first set of control tags represents a sequence of control tags in the first document as to each line feed exactly one control tag is assigned. The assignment of the control tags and the integration of the control tags of the set of control tags into the first document 114 might be performed automatically by the computer program product 110. The computer program product 110 might for example scan the first document 114 for line feed commands and integrate into the document before or after each line feed command a control tag.

The second document 116 might be derived from the first document 114 while the relative positions of the control tags in the text of the second document are preserved with regard to the relative positions of the control tags in the first document. The derivation might for example be made by copying the original English document and by then replacing each sentence in the copied version by the corresponding French sentence thereby preserving the line feeds along with the control tags in the document. The preserved sequence of control tags in the second document corresponds then to the second set of control tags.

Alternatively, the first document 114 and the second document 116 may be derived from a base document which comprises tags, wherein a plurality of invisible control tags is defined in the base document, wherein control characters or more particularly text control characters are used for placing the control tags into the text of the base document. The base document is then transformed into the first document 114 and in the second document 116 with possible modifications, e.g., language translations, in the text while preserving the relative positions of the control tags in the text of the first and second documents.

The control tags might not only be assigned to line feeds. Control tags might in addition or only be assigned to double line feed commands. A double line feed command corresponds to a new paragraph or a new section command. Thus corresponding sections in the first and in the second document can be displayed graphically via the graphical user interface 112 to a user in front of the data processing system 100.

As described above, the first document 114 is used as active document while the second document 116 has played the role of an inactive document meaning that the displayed portion 120 of the second document is adapted to the displayed portion 118 of the first document. Thus, whenever the user for example scrolls down in the portion 118 of the first document thereby changing the position of the control tags in the displayed portion, the portion 120 of the second document is adapted accordingly.

The computer program product 110 might be adapted so that it allows to specify which document shall be the active document and which shall be the passive document which is displayed so that its displayed portion matches the displayed portion of the active document. In that sense, it is evident that there exists a one-to-one relation between the control tags of the first set of control tags and the control tags of the second set of control tags.

Figure 2:
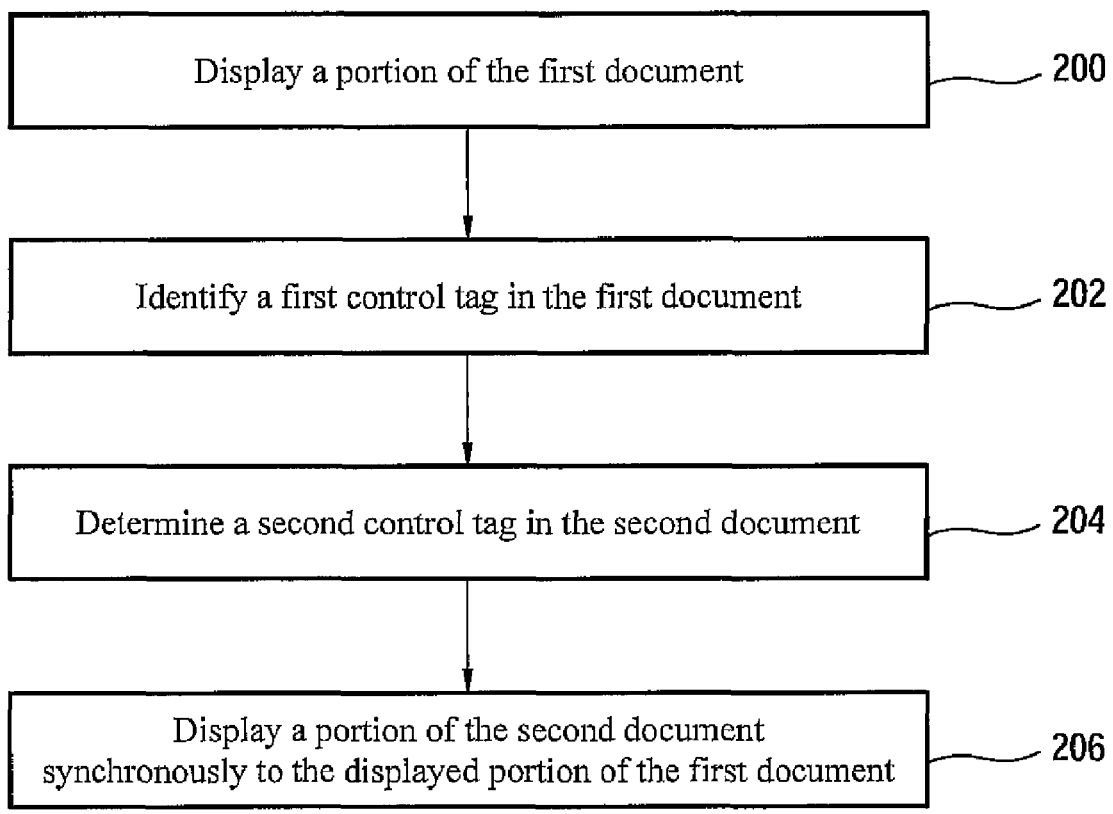
FIG. 2 shows a flow diagram illustrating steps of a method in accordance with the invention.

FIG. 2 shows a flow diagram illustrating steps of a method in accordance with the invention. According to step 200 of the method in accordance with the invention, a portion of the first document is displayed to a user, wherein the first document comprises a first set of control tags. According to step 202 of the method in accordance with the invention, a first control tag is identified in the first document, wherein the first control tag corresponds to the control tag of the first set of control tags which is situated in essence at the top of the displayed portion of the first document. According to step 204 of the method in accordance with the invention, a second control tag of a second set of control tags that is comprised in a second document is determined, wherein the second document comprises the second set of control tags, wherein a control tag of the first set of control tags is uniquely assigned to a control tag of the second set of control tags, and wherein the second control tag corresponds to the control tag of the second set of control tags to which the first control tag is uniquely assigned. According to step 206 of the method in accordance with the invention, a portion of the second document is displayed synchronously to the portion of the first document to the user, wherein the second control tag is situated in essence at the top of the displayed portion of the second document.

Figure 3:
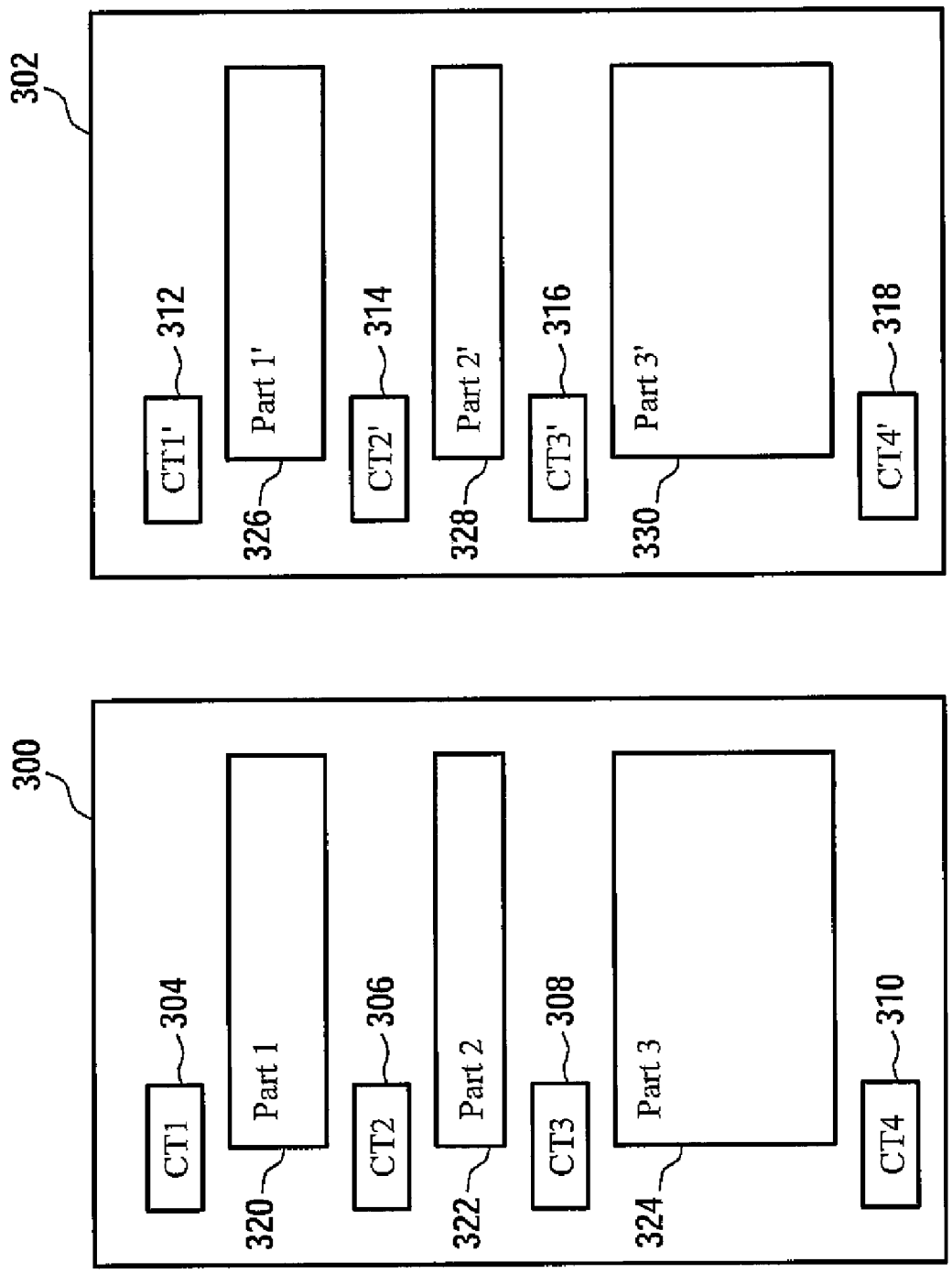
FIG. 3 shows an example of synchronously displayed documents.

FIG. 3 shows an example of a first document 300 that is synchronously displayed with a second document 302 to a user on a computer screen. The first document 300 comprises control tags 304, 306, 308, and 310. The second document 302 comprises control tags 312, 314, 316, and 318. The control tag 304 is placed into the first document 300 so that it precedes all the visualizable content in the first document 300. In particular, the first content precedes a first part 320 of the first document 300. The first part 320 of the first document 300 might for example correspond to a paragraph in the first document 300 which might be a text document. Furthermore, the first part 320 is succeeded by the control tag 306 which precedes a second part 322 of the first document 300. Moreover, the control tag 308 succeeds the second part 322 of the first document and precedes a third part 324 of the first document 300. The third part 324 is succeeded by the control tag 310 which is placed at the end of the first document 300.

The second document 302 comprises a first part 326 which might relate to a drawing for which the first part 320 of the first document 300 provides an explanation. The first part 326 of the second document 302 is preceded by the control tag 312 and succeeded by the control tag 314. The second document 302 furthermore comprises a second part 328 which might relate to a second drawing for which the second part 322 of the first document 300 provides an explanation that describes all the details in the drawing represented by the second part 328. Similarly, the second document 302 comprises a third part 330 that relates to a drawing for which the third part 324 of the first document provides a written explanation. The second part 328 of the second document 302 is embedded into the control tags 314 and 316, while the control tag 316 precedes the third part 330 which precedes the control tag 318.

The control tag 304 is uniquely assigned to the control tag 312. Furthermore, the control tag 306 is uniquely assigned to the control tag 314 and the control tag 308 is uniquely assigned to the control tag 316. Similarly, the control tag 310 is uniquely assigned to the control tag 318. The assignment might, for example, be made manually by a user that has placed the tags manually to the corresponding positions in the first and second document 300, 302.

The first document 300 might for example be displayed completely to the user. Thus the control tag 304 is invisibly located at the top of the displayed first document 300 and the control tag 310 is invisibly located at the bottom of the displayed first document 300. According to an embodiment of a method in accordance with the invention, the second document 302 is then displayed such that the control tag 312 to which the control tag 304 is assigned is invisibly located at the top of the displayed portion of the second document 302 and such that the control tag 318 to which the control tag 310 is assigned is displayed at the bottom of the display portion of the second document 302. As result, the complete second document 302 is synchronously displayed in parallel to the complete first document 300.

When a user scrolls through the first document 300 so that for example the control tag 308 is moved to the top of the displayed portion of a first document 300, the displayed portion of the second document 302 is synchronously adapted so that the corresponding control tag 316 is also moved to the top of the displayed portion of the second document. According to the example mentioned above, the control tag 316 is thus displayed at the top of the displayed portion of the second document 302. Consequently, the user is then able to read the description comprised in the third part 324 of the first document 300 and to immediately identify the corresponding figure shown in the third part 330 of the second document 302. This greatly helps the user to quickly understand the drawing.

The user might for example be an engineer who is installing or repairing a machine component of a complex machine that is described by text in the first document 300 and by corresponding drawings in the second document 302. The third part 330 might show a drawing of the machine component to be repaired and the part 324 of the first document might provide the corresponding explanation. According to an embodiment of the method in accordance with the invention, the engineer is able to display the third part 330 of the second document 302 and the part 324 of the first document 300 in parallel and thereby might be enabled to understand quickly how to repair the machine component. The method in accordance with the invention therefore contributes to shorten the down time of the machine as the engineer is enabled to quickly understand the documents describing the machine.

Figure 4:
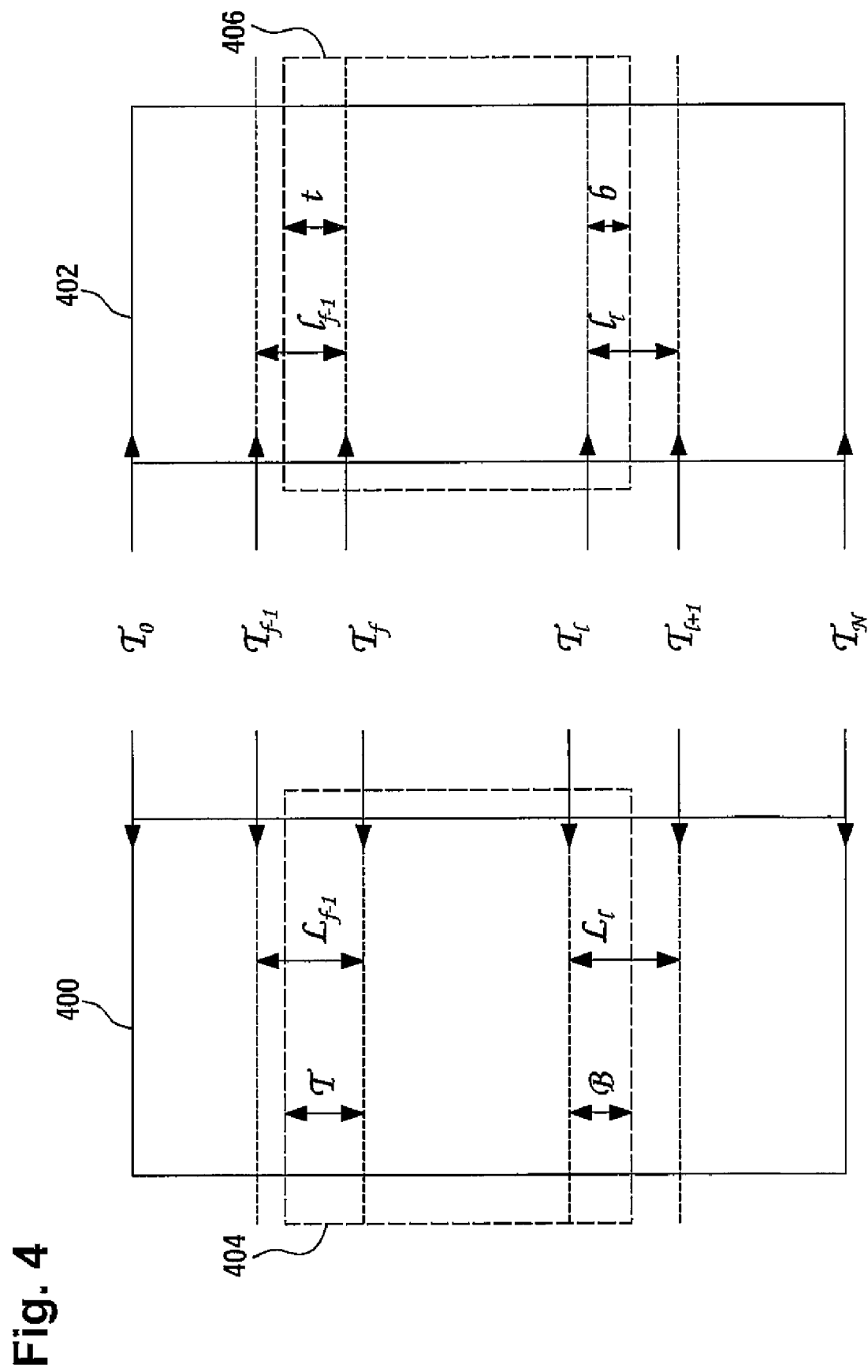
FIG. 4 shows another example of synchronously displayed documents.

FIG. 4 shows another example of a first document 400 that is synchronously displayed with a second document 402. The first document 400 and the second document 402 comprise each a plurality of control tags that are denoted as $T_0, \ldots, T_{f-1}, T_f, \ldots, T_l, T_{l+1}, \ldots, T_N$. The control tags denoted as $T_0$ are located at the top of the first and second documents 400 and 402 while the control tags denoted as $T_N$ are located at the bottom of each document.

In the following it is assumed that only a portion of the first document 400 is located in window 404 which is visualized to a user. Correspondingly, only the portion of the second document 402 that is placed in window 406 is displayed to the user. The windows 404 and 406 might be part of a graphical user interface and thus contain the displayed portions of the documents.

According to FIG. 4, the first control tag that is located in the window 404 is the control tag $T_f$ and the last control tag that is situated in the window 404 is the control tag $T_l$. According to an embodiment of the method in accordance with the invention, the second document 402 is then displayed so that control tag $T_f$ of the second document 402 is arranged at the top of the window 406 and so that the control tag $T_l$ is arranged at the bottom of the window 406. This ensures that the portion of the first document 400 that is contained between $T_f$ and $T_l$ and the corresponding portion of the second document 402 are displayed synchronously to the user.

As the format and/or the arrangements of the various elements in the displayed portions of the first and second document might vary, it might be necessary to adapt the sizes of the displayed portion of the second document 402 in relation to the displayed portion of the first document 400 in order to ensure that the interrelated contents are shown in both windows 404 and 406.

Figure 5:
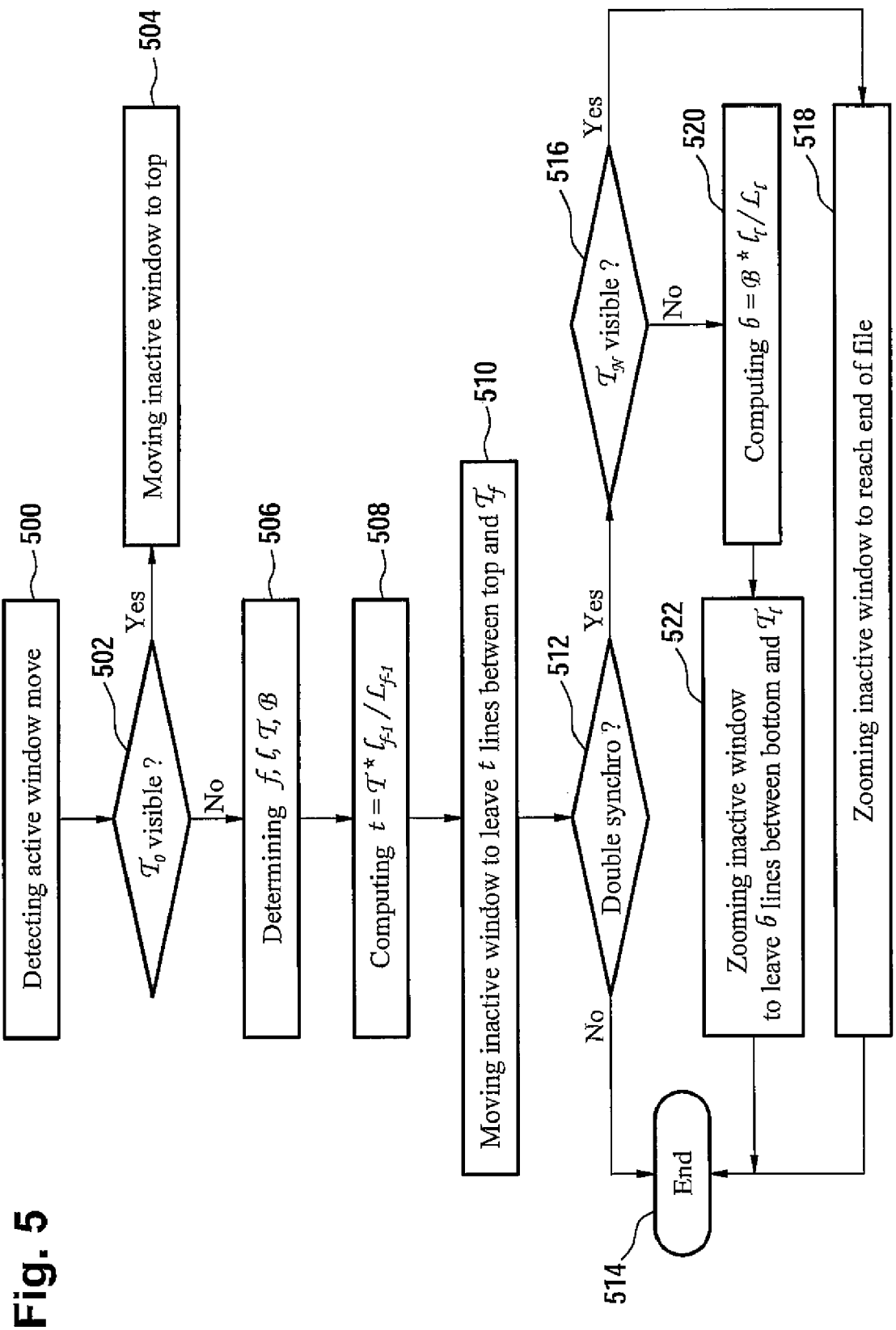
FIG. 5 shows a flow diagram illustrating steps of a method in accordance with the invention.

Further details are explained with reference to FIG. 5 which shows a flow diagram illustrating steps of a method in accordance with the invention. According to step 500 of the method in accordance with the invention, a move of the active window corresponding to a move in the document 400 is detected. According to step 502, it is determined if the first control tag $T_0$ is visible in the window 404. If this is the case, the method in accordance with the invention proceeds with step 504, wherein the inactive window corresponding to the displayed second document 402 is moved such that the control tag $T_0$ is located at the top of the window 406.

If it is found in step 502 that $T_0$ is not visible, then the method proceeds with step 506, wherein f, l, T, B are determined. f corresponds to the index of control tag that is located at the top of the window 404. Please note in this context that the control tags are indexed from 0 to N. Thus f corresponds to a natural number between 0 and N. Furthermore, l corresponds to the index of the control tag that is located at the bottom of the window 404. T corresponds to the number of lines between $T_f$ and the very top of the display 404 and B corresponds to the number of lines between $T_l$ and the very bottom of the window 404.

According to step 508, the term:

$$t = T \times l_{f-1}/L_{f-1} \text{ is determined.}$$

$L_{f-1}$ with respect to document 400 and correspondingly $l_{f-1}$ with respect to the document 402 denote the number of lines that lie between $T_{f-1}$ and $T_f$. t relates therefore to the number of lines that are to be placed between the very top of the window 406 and $T_f$.

The inactive window corresponding to the visible portion of the second document is then moved so that t lines between the top of the window 406 remain.

In step 512 of the method in accordance with the invention, it is furthermore determined if the visualization of the first and second document 400, 402 shall also be synchronized with regard to the end of the visible portions. If this is not the case, the method ends in step 514.

However, if the so called double synchronization shall be applied, the method in accordance with the invention proceeds with step 516, wherein it is determined if $T_n$ is visible in the window 402. If this is the case, then the method proceeds with step 518, wherein the second document 402 corresponding to the inactive window is zoomed so that the end of the second document 402 is visible within the window 406.

If it is found in step 516 that $T_N$ is not visible in the first document 400, the method proceeds with step 520, wherein the expression:

$$b = B \times l_l/L_l \text{ is computed.}$$

$L_l$ with respect to document 400 and correspondingly $l_l$ with respect to the document 402 denote the number of lines that lie between $T_{l-1}$ and $T_l$. b relates thus to the number of lines that are to be placed between the very bottom of the window 406 and $T_l$.

The method then proceeds with step 522, wherein the inactive window is zoomed to leave b lines between the bottom of the window 406 and $T_l$.

Step 518 as well as step 522 are succeeded by step 514 in which the method ends.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method of displaying synchronously a first document and a second document to a user, wherein the first document comprises a first set of control tags, wherein the second document comprises a second set of control tags, and wherein a control tag of the first set of control tags is uniquely assigned to a control tag of the second set of control tags, the method comprising:

displaying a portion of the first document to the user;
identifying a first control tag in the first document, wherein the first control tag corresponds to the control tag of the first set of control tags which is situated at a top of the displayed portion of the first document;
determining a second control tag in the second document, wherein the second control tag corresponds to the control tag of the second set of control tags to which the first control tag is uniquely assigned; and
displaying a portion of the second document to the user, wherein the second control tag is situated at a top of the displayed portion of the second document;
wherein a control tag of the first set of control tags is defined for a control character in the first document, and wherein a control tag of the second set of control tags is defined for the control character in the second document.

2. The method according to claim 1, further comprising:
identifying a third control tag in the first document, wherein the third control tag corresponds to the control tag of the first set of control tags which is situated at a bottom of the displayed portion of the first document,
determining a fourth control tag, wherein the fourth control tag corresponds to the control tag of the second set of control tags to which the third control tag is uniquely assigned; and
displaying the portion of the second document to the user, wherein the fourth control tag is situated at a bottom of the displayed portion of the second document.

3. The method according to claim 1, further comprising:
adapting a size of the displayed portion of the second document so that a length of the displayed portion of the second document matches a length of a displayed portion of the first document; and
adapting the size of the displayed portion of the second document so that a width of the displayed portion of the second document matches a width of the displayed portion of the first document.

4. The method according to claim 3, further comprising displaying the portions of the first and second documents side by side.

5. The method according to claim 1, further comprising:
defining the control tags of the first set of control tags in the first document, wherein with exception of the control tag situated at an end of the first document, each control tag of the first set of control tags precedes a particular part of the first document, wherein a particular part of the first document relates to a particular part of the second document; and
defining the control tags of the second set of control tags such that a control tag of the second set of control tags to which a control tag of the first set of control tags is uniquely assigned precedes the part of the second document which is related to the part of the first document that is preceded by the control tag of the first set of control tags.

6. The method according to claim 5, further comprising displaying the part of the first document that is preceded by a control tag of the first set of control tags side by side with the part of the second document that is preceded by the control tag of the second set of control tags to which the control tag of the first set of control tags is uniquely assigned.

7. The method according claim 1, further comprising:
defining the control tags of the first set of control tags in the first document, wherein with exception of the control tag situated at an end of the first document, each control tag of the first set of control tags precedes a particular part of the first document; and
deriving the second document from the first document, wherein a control tag of the first set of control tags is uniquely assigned to a control tag of the second set of control tags such that a control tag of the second set of control tags precedes the part of the second document which is derived from the part of the first document that is preceded by the corresponding control tag of the first set of control tags.

8. The method according to claim 1, wherein the control tags of the first set of control tags and the control tags of the second set of control tags are invisible to the user.

9. The method according to claim 1, wherein a first control character in the first document relates to a second control character in the second document, wherein the control tag of the first set of control tags which is defined for the first control character is uniquely assigned to the control tag of the second set of control tags which is defined for the second control character.

10. The method according to claim 1, wherein the control character relates to a new line command or to a new section command.

11. A computer program product comprising computer executable instructions provided on a non-transitory computer readable medium, the computer executable instructions, when executed by a computer, being adapted to perform steps of the method in accordance with claim 1.

12. A data processing system for displaying synchronously documents to a user comprising:
a system for displaying a portion of a first document to a user, wherein the first document comprises a first set of control tags;
a system for identifying a first control tag in the first document, wherein the first control tag corresponds to the control tag of the first set of control tags which is situated at a top of the displayed portion of the first document;
a system for determining, using a microprocessor of the data processing system, a second control tag in a second document, wherein the second control tag corresponds to the control tag of a second set of control tags to which the first control tag is uniquely assigned, wherein the second set of control tags is comprised in the second document, and wherein a control tag of the first set of control tags is uniquely assigned to a control tag of the second set of control tags; and
a system for displaying a portion of the second document to the user, wherein the second control tag is situated at the top of the displayed portion of the second document;
wherein a control tag of the first set of control tags is defined for a control character in the first document, and wherein a control tag of the second set of control tags is defined for the control character in the second document.

13. The data processing system according to claim 12, further comprising:
a system for identifying a third control tag in the first document, wherein the third control tag corresponds to the control tag of the first set of control tags which is situated at a bottom of the displayed portion of the first document;
a system for determining a fourth control tag, wherein the fourth control tag corresponds to the control tag of the second set of control tags to which the third control tag is uniquely assigned; and
a system for displaying the portion of the second document to the user, wherein the fourth control tag is situated at the bottom of the displayed portion of the second document.

14. The data processing system according to claim 12, further comprising:
a system for adapting a size of the displayed portion of the second document so that a length of the displayed portion of the second document matches a length of the displayed portion of the first document; and
a system for adapting the size of the displayed portion of the second document so that a width of the displayed portion of the second document matches a width of the displayed portion of the first document.

15. The data processing system according to claim 14, further comprising a system for displaying the portions of the first and second documents side by side.

16. The data processing system according to claim 12, further comprising:

a system for defining the control tags of the first set of control tags in the first document, wherein with exception of the control tag situated at an end of the first document, each control tag of the first set of control tags precedes a particular part of the first document, wherein a particular part of the first document relates to a particular part of the second document; and a system for defining the control tags of the second set of control tags such that a control tag of the second set of control tags to which a control tag of the first set of control tags is uniquely assigned precedes the part of the second document which is related to the part of the first document that is preceded by the control tag of the first set of control tags.

17. The data processing system according to claim 16, further comprising a system for displaying the part of the first document that is preceded by a control tag of the first set of control tags side by side with the part of the second document that is preceded by the control tag of the second set of control tags to which the control tag of the first set of control tags is uniquely assigned.

18. The data processing system according to claim 12, further comprising:

a system for defining the control tags of the first set of control tags in the first document, wherein with exception of the control tag situated at an end of the first document, each control tag of the first set of control tags precedes a particular part of the first document; and a system for deriving the second document from the first document, wherein a control tag of the first set of control tags is uniquely assigned to a control tag of the second set of control tags such that a control tag of the second set of control tags precedes the part of the second document which is derived from the part of the first document that is preceded by the corresponding control tag of the first set of control tags.

* * * * *